United States Patent Office 3,524,318
Patented Aug. 18, 1970

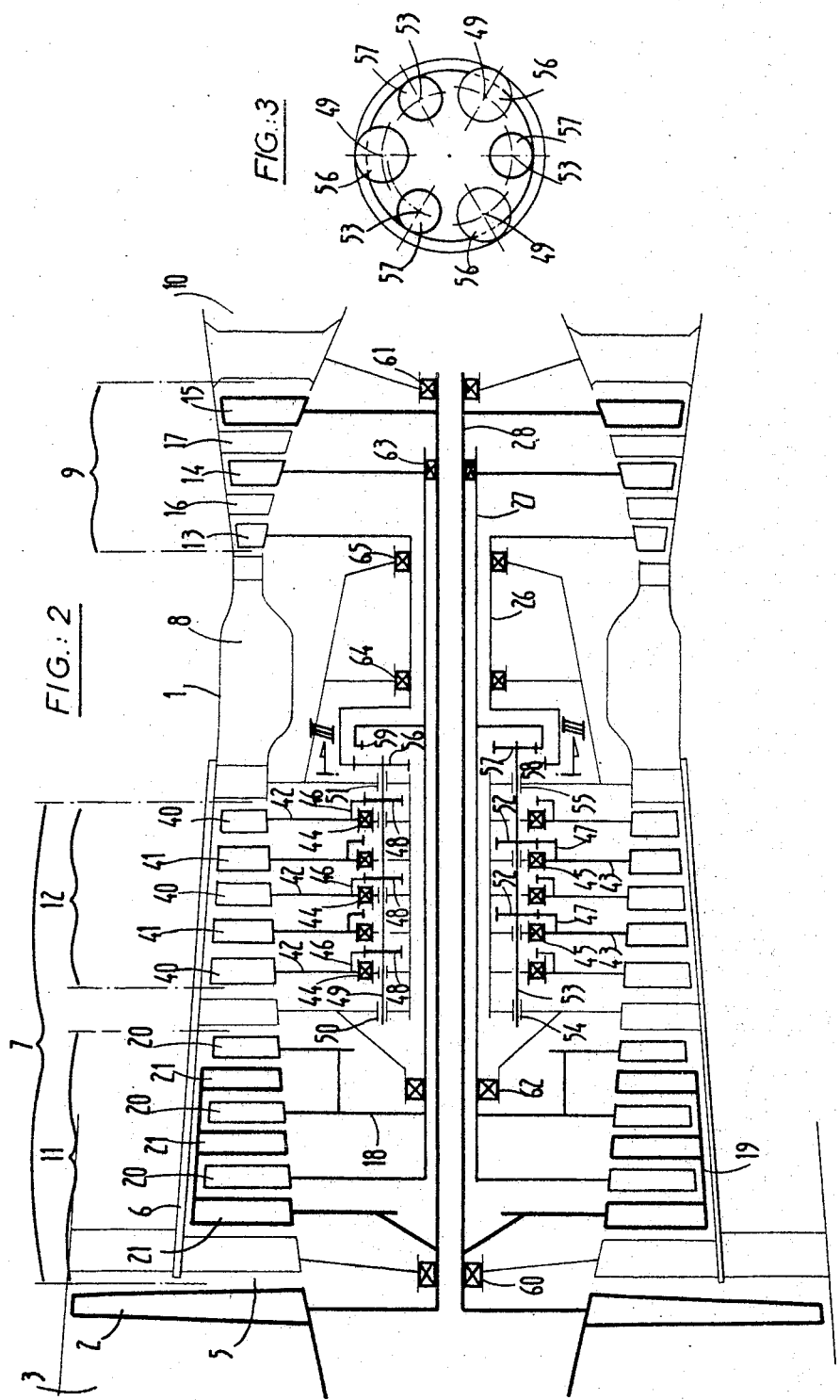

3,524,318
GAS TURBINE POWER PLANTS HAVING AXIAL-FLOW COMPRESSORS INCORPORATING CONTRAROTATING ROTORS
Louis Jules Bauger, Vanves, Jean Georges Bouiller, Brunoy, Michel Robert Garnier, Sceaux, and Armand Jean-Baptiste Lacroix, Itteville, France, assignors to Societe Nationale d'Etude et de Construction de Moteurs d'Aviation, Paris, France, a French company
Filed Dec. 11, 1968, Ser. No. 783,019
Claims priority, application France, Dec. 14, 1967
132,312
Int. Cl. F02c *3/06;* F02k *3/06*
U.S. Cl. 60—226                               8 Claims

ABSTRACT OF THE DISCLOSURE

A gas turbine power plant comprising a compressor split up into $n$ coaxial sections arranged in series, each of which incorporates two contrarotating rotors, and comprising a turbine equipped with $(n+1)$ independent contrarotating wheels, each of said wheels drivng two rotors respectively belonging to two successive sections in the compressor with the exception of the first and last turbine wheels, each of which drives only a single rotor.

---

This invention relates to a gas turbine power plant comprising an axial-flow compressor and a turbine, of the kind in which the compressor is split into $n$ coaxial units, $n$ being a number equal to at least two, arranged in succession in the downstream direction, each of which comprises, distributed amongst two contrarotating rotors, a plurality of successive blade rings rotating in mutually opposite directions considered from one to the next in the axial direction, the assembly of blade rings rotating in one direction constituting a first rotor and the assembly of those rotating in the other direction constituting a second rotor.

As those skilled in the art will be well aware, the imparting of a contra-rotating movement to the successive blade rings of a compressor is accompanied by an increase in the stage compression ratio. Thus, in order to obtain the same overall compression ratio, and provided that the areodynamic characteristics of the system remain acceptable, it is possible to reduce the number of stages in the compressor. This advantage is associated with the possibility of achieving, between two successive blade rings rotating in mutually opposite directions, much higher relative peripheral velocities than are possible when using a fixed blade ring associated with a moving blade ring.

For example, installations are known in which the compressor comprises an internal first rotor and an external second rotor, rotating in mutually opposite directions, the drive to the first rotor being effected from a wheel of the turbine through the medium of a shaft connected to the internal periphery of the blade rings belonging to said rotor, whilst the drive to the second rotor is effected from another wheel of the turbine through the medium of another shaft, coaxial with the first, and a shell (or drum) attached to the external periphery of the blade rings of said second rotor, the transmitting connection between said casing or drum and said drive shaft being effected through the upstream extremity of said shell at the end opposite to the said turbine wheels.

The artifice of driving the external rotor through its upstream extremity results, amongst other advantages, that the drive is torque is exerted in a cold zone of the machine, and that a better distribution of the loading among the turbines is achieved.

In this known arrangement, the compressor comprises a single section or unit wherein all the blade rings belonging to one and the same rotor rotate at a same predetermined velocity.

However, it is well known, in a general way, that it is considerations relating to the rotor blades of the first or upstream stage of the compressor, which, by reason of the high value reached in this stage of the compressor by the ratio $h/r_m$ of the height $h$ of said blades to the mean radius $r_m$ at which they rotate (said ratio being significant of the difficulty which is encountered in making the blades sufficiently strong to withstand centrifugal stresses), limit the peripheral velocity which can be imparted to the rotor of said compressor (see FIG. 1). The result is that the blades in the stages situated further downstream (in respect of which the ratio $h/r_m$ is lower) have to withstand a lower mechanical stress so that, even taking into account other factors such as thermal fatigue phenomena which occur in particular in the downstream stages of the compressor, these blades are rotating at a lower velocity than that at which they theoretically could, with the consequence that they do not generate the highest possible pressure rise, whereby the overall efficiency of the power plant is reduced.

To overcome this drawback, it has already been proposed that a "double unit" or "multi-unit" system be employed, in which the compressor is split into two or more coaxial compressor sections arranged in-line in extension of one another, and rotating at different velocities.

In trying to apply a similar kind of system to contra-rotating compressors, however, one comes up against difficulties of design and assembly arising out of the necessity to provide, from the turbine wheels to the various compressor rotors which they have to drive, a larger number of independent transmission arrangements.

This problem is still further complicated where, considering contrarotating compressors with rotors having blade rings carried by external shells or drums, it is desired to drive said rotors through the upstream extermity of said shells or drums, from the most remote of the turbine wheels, or again, where the provision of a supplementary upstream fan is involved, as in the case of a dual-flow gas turbine jet propulsion engine of the ducted fan type.

It is an object of the invention to simplify the driving of contra-rotating compressors of "multi-unit" kind, by using only a restricted number of independent transmission arrangements, whilst at the same time ensuring good distribution of the loadings between the various elements of the compressor and the turbine, and high efficiency compression in each of the "sections" of the compressor.

In accordance with the invention, in the case of a gas turbine power plant of the kind hereinbefore described the turbine comprises $(n+1)$ independent wheels fixed to rotate with $(n+1)$ coaxial transmission shafts, said wheels respectively rotating in mutually opposite directions considered from one to the next, and each driving, through the medium of the shaft to which it is fixed, two rotors respectively belonging to two successive compressor sections, with the exception of the first and last wheels each of which drives only one rotor.

In accordance wjth an embodiment applicable to the case in which each of the sections of the compressor comprises, on the one hand, a first or internal rotor driven from a wheel of the turbine through the medium of a first shaft connected to the internal periphery of the blade rings belong to said internal rotor, and, on the other hand, a second or external rotor driven from another wheel of the turbine through the medium of a second shaft coaxial with the first one and of an external shell (or drum) fixed to the external periphery of the blade rings belong to said external rotor, the two rotors which are driven by the same wheel of the turbine and which belong to two successive sections of the compressor are constituted, respectively, by an internal and an external rotor.

In accordance with an advantageous arrangement which is applicable in this latter case, the internal rotor and the external rotor, driven from the same turbine wheel, belong respectively to two sections of the compressor the first of which is situated upstream of the second.

In accordance with another arrangement, the shaft which drives a shell-type external rotor is coupled to said rotor in the neighborhood of the upstream extremity of said shell.

In accordance with an arrangement applicable to the case in which one of the sections of the compressor has no rotor mounted on an external shell or drum, the blade rings associated respectively with one and the other of the two contra-rotating rotors of said section are driven individually, through their internal peripheries, from one or other of the two contra-rotating transmission shafts associated with said section, each of said blade rings having its own drive arrangements connecting it with the corresponding transmission shaft.

In accordance with another embodiment applicable to a gas turbine jet propulsion engine of the ducted-fan kind in which air is moved through a separate duct by a fan having at least one ring of rotor blades, said ring is fixed to and rotates with one of the rotors of the upstream section of the compressor.

The ensuing description referring to the accompanying drawing will indicate by way of a non-limitative example how the invention may be carried into practice.

In the drawings:

FIG. 2 is a schematic axial sectional view of a variant embodiment; and

FIG. 3 is a schematic transverse section on the line III—III of FIG. 2, showing a detail of the arrangement.

Figure 1:
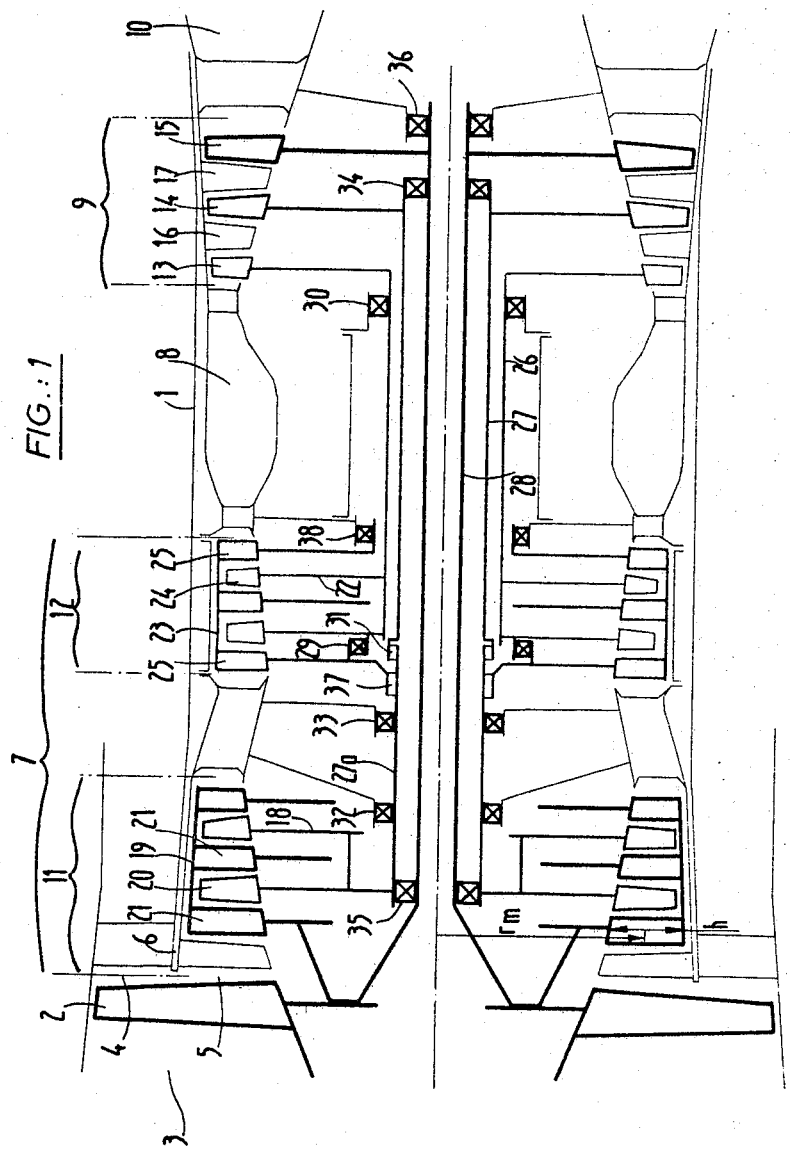
FIG. 1 is a schematic axial sectional view of a gas turbine power plant in accordance with the invention, applied to a dual-flow gas-turbine jet engine of the ducted-fan type used for propulsion purposes.

FIG. 1 illustrates a dual-flow gas turbine jet propulsion engine of the ducted fan type comprising a series of rotor elements rotating in a fixed casing designated by the general reference 1. A fan 2, supplied via an air intake 3, discharges in parallel into an external circuit 4 and an internal circuit 5, separated from one another by a wall 6.

The air in the internal circuit is successively compressed through the consecutive stages of a multi-section compressor 7, with contra-rotating blade rings, heated in a combustion chamber 8 and expanded through the successive stages of a gas turbine 9, whereafter it is discharged through a duct 10 into a nozzle which has not been shown.

In the embodiment chosen by way of example, the compressor 7 comprises two sections 11 and 12, although it will be apparent that the invention is in no way limited to this number. Similarly, the turbine 9 comprises three independent rotor wheels 13, 14, 15, the number of these wheels in all cases being greater by one than that of the sections of the compressor. The wheels 13, 14, 15 rotate in mutually opposite directions, considered from one wheel to the next. The references 16 and 17 have been used to designate stator blade rings arranged between successive wheels of the turbine. These stator blade rings, because of the contra-rotating design of the wheels 13, 14, 15, are not essential however.

The first section 11 of the compressor comprises two rotors 18, 19 rotating in mutually opposite directions, the respective blade rings of said rotors being designated by the references 20 and 21. As the figure shows, the rings 21 of the external rotor are secured at their external periphery to a common shell (or drum).

The second section 12 has a structure similar to that of the first section 11 and therefore likewise comprises two contra-rotating rotors 22, 23, respectively carrying blade rings 24, 25, the external rotor 23 likewise being of the external shell or drum type.

Transmission shafts 26, 27, 28 provide the power transmission between the rotor wheels of the turbine and the various rotors of the compressor. A first power transmission arrangement is created in the form of the shaft 26, between the high-pressure wheel 13 of the turbine and the internal rotor 22 of the high-pressure section of the compressor. A second power transmission is effected through the shaft 27, between the medium-pressure wheel 14 of the turbine and the external rotor 23 of the high-pressure section of the compressor, as well as the internal rotor 18 of the low-pressure section of the compressor. A third power transmission is finally created, through the medium of the shaft 28, between the low-pressure wheel 15 of the turbine and the external rotor 19 of the low-pressure section of the compressor. The shaft 28 serves also to drive the rotor blade ring of the upstream fan 2. It will be noted that the medium-pressure wheel 14 simultaneously drives two rotors belonging to two successive sections of the compressor, whereas the other two wheels 13 and 15, only drive a single rotor each. In a general fashion, in the case where the turbine has $(n+1)$ wheels, only the $(n-1)$ intermediate wheels will be employed, in each case, simultaneously to drive two rotors belonging to two successive sections of the compressor, whilst the two terminal wheels will each drive only a single rotor.

A method of centering the various rotational elements of the power plant will be explained hereinafter. The shaft 26 driving the internal rotor 22 of the high-pressure compressor section, is centered on a front contrarotating bearing 29, carried by the upstream flange of the external rotor of said high-pressure section, and by a rear bearing 30 mounted on the fixed casing of the power plant.

The shaft 27 driving the external rotor 23 of the high-pressure compressor section and the internal rotor 18 of the low-pressure compressor section, is constituted by two parts connected with one another through a splined coupling 31. The upstream part 27a of this shaft, which provides the drive to the two rotors, is centered by a front bearing 32 and a rear bearing 33, both mounted on the fixed casing of the power plant.

The downstream part of the shaft 27, fixed to the turbine wheel 14, is centered at the front by the splined arrangement 31 and, at the rear, by a bearing 34 of contrarotating type carried by the transmission shaft 28.

The shaft 28 driving the fan 2 and the external rotor 19 of the low-pressure compressor section, is centered by a front bearing 35 of contrarotating type located in the front journal of the internal rotor of said low-pressure section, and by a rear bearing 36 mounted on the fixed casing of the power plant.

The external rotor 23 of the high-pressure compressor section is centered, at the front, on the shaft 27a, by a splined coupling 37 and, at the rear, by a bearing 38 secured to the fixed casing of the power plant.

The bearings 29, 33, 34, 35 and 38 will preferably take the form of roller bearings while the bearings 30, 32, 36 will advantageously be in the form of ball bearings.

As above stated, a machine designed in this fashion offers the advantages that it only uses a restricted number of independent power transmissions between the turbine and the compressor, it provides better distribution of loading between the various elements of the compressor and the turbine, and operates, throughout all stages of the compressor, with higher efficiency than is obtainable in known arrangements. It will be noted, too, that the internal high-pressure rotor 22 is the only element driven from the high-pressure wheel 13 through the medium of the shaft 26. Accordingly, its velocity of rotation is not limited by the presence on the same shaft of an external shell-type rotor belonging to another compressor section, which, rotor, because of the presence of said external shell, is more sensitive to the effects of centrifugal force, as those skilled in the art will realise. Accordingly, in this internal high-pressure rotor, we have a compressor element which can be exploited to the full extent, to the benefit of the overall efficiency of the power plant.

FIG. 2 relates to a variant embodiment of the invention. In this figure, the main elements described in relation to FIG. 1 can be seen, and the same reference numbers have been used as in said figure, said elements being namely the fan 2, the compressor 7 with its two units 11 and 12, the turbine 9 with its independent contrarotating wheels 13, 14, 15, and the transmission shafts 26, 27, 28. As in the case of FIG. 1, the rotor 19 with its external shell or drum, belonging to the low-pressure section 11 of the compressor 7, is driven through the upstream extremity of said shell, simultaneously with the blade ring of the fan 2, by the low-pressure wheel 15 of the turbine 9 through the medium of the shaft 28, while the internal rotor 18 of the said section is driven by the medium pressure wheel 14 of the turbine, through the shaft 27.

The variant embodiment illustrated in this figure differs from the embodiment described in relation to FIG. 1, substantially in terms of the arrangements concerning the structure of the high-pressure section 12 of the compressor 7, and the driving of the contrarotating blade rings 40, 41 of said section from the high-pressure and medium-pressure wheels 13 and 14 of the turbine 9. These arrangements are intended essentially to make it possible to discard the peripheral shell of the external rotor of the high-pressure section, and to provide independent contrarotating blade rings centered on the fixed casing of the machine and driven separately, this with the idea of making it possible to achieve higher velocities of rotation and, consequently, an increase in the compression ratio per stage.

As FIG. 2 shows, the blade rings 40, 41 of the high-pressure compressor section are carried, respectively, by discs 42, 43 individually centered on the fixed casing of the power plant through the medium of bearings 44, 45, for example of ball bearing kind. These discs each comprise an axial boss terminating in an internally toothed wheel marked 46 in the case of the discs 42 and 47 in the case of the discs 43. Each of the internally toothed wheels 46 meshes with at least one gear 48 fixed to rotate with a shaft 49 carried in bearings 50, 51 secured to the fixed casing of the power plant. Similarly, each of the internally toothed wheels 47 meshes with at least one gear 52 fixed to rotate with a shaft 53 carried in bearings 54, 55 likewise mounted on the fixed casing of the power plant. The gears 48, 52, associated with the respective wheels 46, 47, preferably number three in the case of each wheel and are distributed barrel-fashion around the axis of the power plant. Each of the shafts 49 or 53 is secured to rotate with a supplementary gear 56 or 57, fixed to that end of said shaft which faces the turbine.

The gears 56, numbering three in the present example (see FIG. 3), mesh with an internally toothed wheel 58 fixed to the shaft 26. Similarly, the gears 57, likewise numbering three, mesh with another internally toothed wheel 59 fixed to rotate with the shaft 27.

The shaft 28, driving the external rotor 19 of the low-pressure section of the compressor, as well as the blade ring of the fan 2, is centered in a front bearing 60 and a rear bearing 61 both secured to the fixed casing of the power plant. The shaft 27 driving the internal rotor 18 of the low-pressure section of the compressor and the blade rings 41 of the high-pressure section of the compressor, is centered in a front bearing 62 secured to the fixed casing of the power plant, and in a rear bearing 63 of contrarotating type, carried by the shaft 28. The shaft 26 driving the blade rings 40 is centered in the fixed casing by means of two bearings 64, 65. The bearings 60, 62, 64 will advantageously be in the form of ball bearings, whilst the bearings 61, 63, 65 will preferably be roller bearings.

In operation, the high-pressure wheel 13 of the turbine drives the internally toothed wheel 58 and, consequently, through the gears 56 and 48 and the internally toothed wheels 46, the blade rings 40 of the high-pressure section of the compressor.

Similarly, the medium-pressure wheel 14 of the turbine, through the medium of the shaft 27, the internally toothed wheel 59, the gears 57 and 52 and the internally toothed wheels 47, drives the blade rings 41 of said high-pressure section in the opposite direction.

The transmission ratios between the gears 48 and the internally toothed wheels 46, or between the gears 52 and the internally toothed wheels 47, are selected in the particular example illustrated, to be identical in respect of all stages of the high-pressure compressor section, but it will be apparent that these ratios could be modified and adapted to the particular most favourable value for each stage.

The omission from the high-pressure compressor section of any peripheral rotating shell, as hereinbefore stated, means that the blade rings can be rotated at much higher velocities, thus increasing the overall compression ratio of the compressor and, consequently, improving the overall efficiency of the power plant for a given gas temperature at the turbine intake.

What is claimed is:

1. In a gas turbine power plant, the combination comprising:
   an axial-flow compressor split into $n$ coaxial tandem sections, $n$ being equal to at least two, each section comprising contrarotating first and second rotors having a plurality of blade rings which are distributed between the rotors so that blade rings which are successive in the axial direction rotate in mutually opposite directions;
   a turbine having $(n+1)$ successive turbine wheels of which adjacent successive wheels rotate in mutually opposite directions, whereby the turbine comprises a first, at least one intermediate, and a last turbine wheel;
   $(n+1)$ coaxial rotary transmission shafts respectively connected to rotate with the said turbine wheels;
   means drivingly connecting the transmission shaft associated with the intermediate turbine wheel to two compressor rotors respectively belonging to two successive compressor sections; and
   means drivingly connecting the transmission shafts associated with the first and last turbine wheels each to one of the two remaining compressor rotors.

2. The combination claimed in claim 1, wherein the said connecting means, for at least one of the compressor sections, comprises a plurality of independent drive arrangements connecting the inner peripheries of the individual blade rings of each rotor of said section with the respective transmission shaft for said rotor.

3. The combination claimed in claim 1, wherein one of the rotors of at least one of the compressor sections comprises an external rotary shell fixed to the respective external peripheries of the blade rings belonging to said rotor, and wherein the transmission shaft driving said rotor is connected to the latter at the upstream extremity of said external rotary shell.

4. The combination claimed in claim 1, forming part of a dual-flow gas turbine jet propulsion engine of the ducted fan type, the combination further comprising a fan having at least one ring of rotor blades and means connecting said fan blade ring for rotation with one of the rotors of the upstream section of the compressor.

5. In a gas turbine power plant, the combination comprising:
   an axial-flow compressor split into $n$ coaxial tandem sections, $n$ being equal to at least two, each section comprising contrarotating internal and external rotors having a plurality of blade rings which are distributed between the rotors so that blade rings which are successive in the axial direction rotate in mutually opposite directions;

a turbine having $(n+1)$ successive turbine wheels of which adjacent successive wheels rotate in mutually opposite directions, whereby the turbine comprises a first, at least an intermediate, and a last turbine wheel;

$(n+1)$ coaxial rotary transmission shafts respectively connected to rotate with the said turbine wheels;

an external rotary shell fixed to the respective external peripheries of the blade rings of each external rotor;

means drivingly connecting the transmission shaft associated with the intermediate turbine wheel to the internal rotor of one compressor section and to the external shell of the external rotor of an adjacent compressor section; and means drivingly connecting the transmission shafts associated with the first and last turbine wheels each to one of the two remaining compressor rotors.

6. The combination claimed in claim 5, wherein the said external rotor belongs to a compressor section located downstream of the compressor section having the said internal rotor which is driven by the same transmission shaft as said external rotor.

7. The combination claim in claim 5, wherein the transmission shaft driving an external rotor is connected to the latter at the upstream extremity of said external rotary shell.

8. The combination claimed in claim 5, forming part of a dual-flow gas turbine jet propulsion engine of the ducted fan type, the combination further comprising a fan having at least one ring of rotor blades and means connecting said fan blade ring for rotation with one of the rotors of the upstream section of the compressor.

References Cited

UNITED STATES PATENTS

| 2,430,399 | 11/1947 | Heppner | 60—39.16 |
| 3,363,831 | 1/1968 | Garnier | 230—133 |
| 3,391,540 | 7/1968 | Bauger | 60—226 |
| 3,465,524 | 9/1969 | Wilde | 60—39.16 |

DOUGLAS HART, Primary Examiner

U.S. Cl. X.R.

60—39.16, 268; 230—116, 123; 415—68